Aug. 4, 1964 J. F. O. EVANS ETAL 3,143,714

HALL EFFECT DEVICES

Filed Dec. 16, 1960

INVENTORS:
J. F. O. EVANS &
J. B. DUNNE
BY: Moore & Hall
ATTORNEYS.

United States Patent Office 3,143,714

Patented Aug. 4, 1964

3,143,714

HALL EFFECT DEVICES

John Fawcett Ogilvie Evans, Cheltenham, and John Brian Dunne, Charlton Kings, Cheltenham, England, assignors to Smiths America Corporation, Lakeland, Fla.

Filed Dec. 16, 1960, Ser. No. 76,169

Claims priority, application Great Britain Dec. 21, 1959

12 Claims. (Cl. 332—51)

Figures 1, 2, 3, 4, 5:
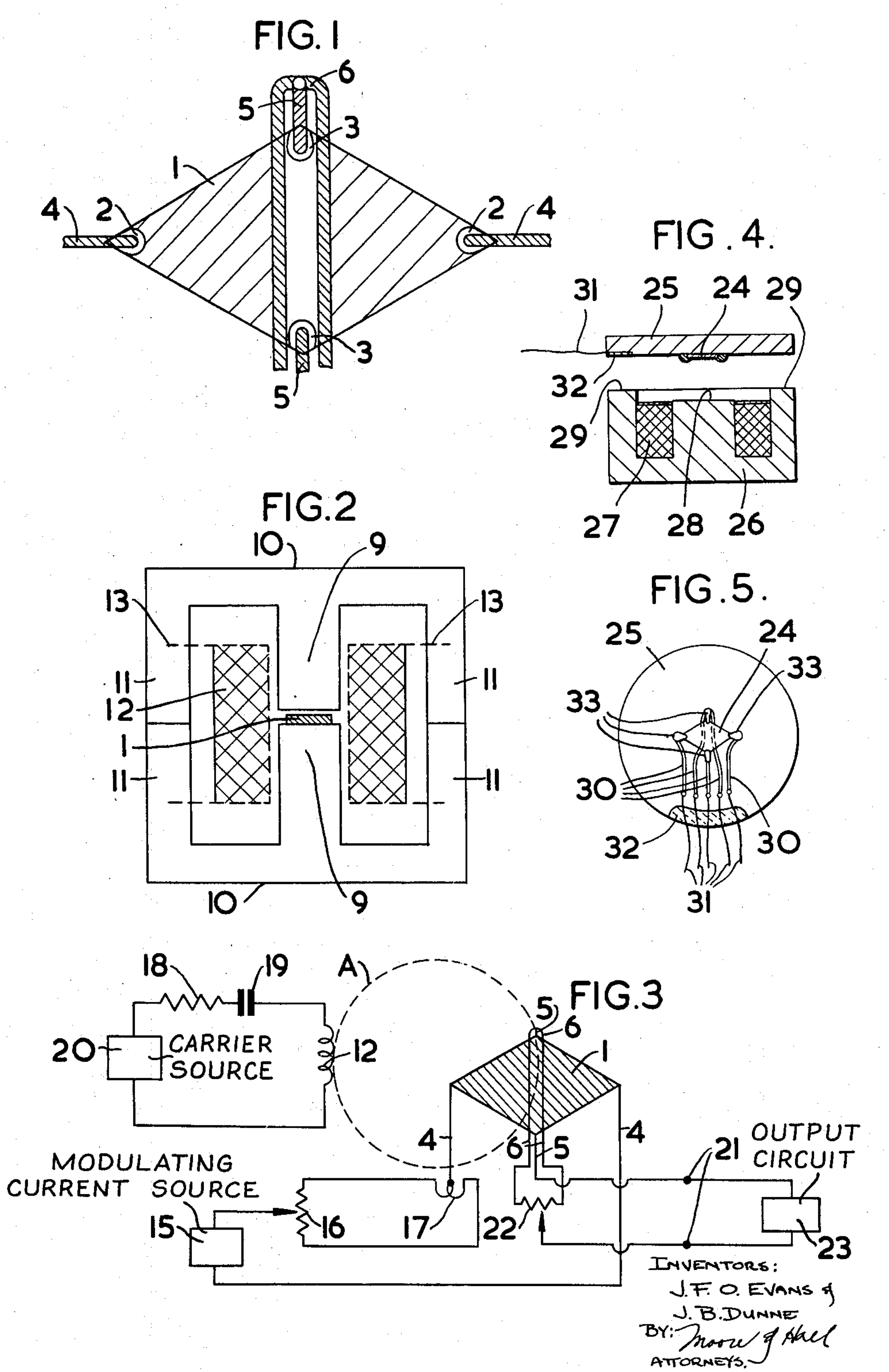

The present invention relates to Hall effect devices, that is to say devices including an element, normally of a material selected from those having a relatively high Hall effect co-efficient, arranged to enable use to be made of the Hall effect, namely that if a magnetic field is applied to the element in one direction and an electric current is caused to flow through the element in a second direction at right angles to the first one, then a so-called "Hall voltage" will appear across electrodes spaced from one another in or on the element in a direction at right angles to both the first and the second directions.

Considering an element positioned with respect to a set of Cartesian co-ordinate axes (OX, OY and OZ), if a current of $i_x$ amps is caused to flow through the element parallel to OX, and a magnetic field of $B_y$ gauss is applied in the direction OY, then the Hall voltage $V_z$ is given by:

$$V_z=\frac{KRi_xB_y10^{-8}}{\Delta_z}\text{ volts} \qquad (1)$$

where $\Delta_z$ is the effective thickness of the element in the direction OZ in centimetres, R is the Hall constant of the material expressed as cubic centimetres per Coulomb and K is a constant dependent on geometry. With good design K approaches unity and it will be assumed to be so elsewhere in this specification.

The present invention is concerned in particular with Hall effect devices for use as modulators and also with like Hall effect devices for use as demodulators or in general for the multiplication of a pair of quantities which can be represented by a current and a magnetic field.

In a modulator, if the magnetic field is caused to vary sinusoidally with time so that it may be represented as $B_0 \sin \omega t$, where $B_0$ is peak value of the field, the frequency of the sinusoidal variation is $\omega/2\pi$, and the current $i_z$ is a function of time which may be represented by $I(t)$, then we have from Equation 1:

$$V_z=\frac{KR.I(t).B_0 \sin \omega t\times 10^{-8}}{\Delta_z} \qquad (2)$$

From this it can be seen that $V_z$ will take the form of a sinusoidal voltage modulated in amplitude in accordance with the variations of $I(t)$, the modulation being of the form known as suppressed carrier modulation.

In designing Hall effect devices for use as modulators, difficulties are encountered in producing devices having stable characteristics and adequate sensitivity.

It is an object of the invention to provide a highly stable modulation structure having an output with substantially less than one percent harmonic distortion suitable for control systems.

It is an object of the invention to provide devices which are highly stable over an extended temperature range, having an equivalent input drift substantially less than one micro-ampere from below the freezing point to the boiling point of water under standard conditions.

It is an object of the invention to provide highly stable and accurate Hall effect devices of rhombic configuration with electrodes in the corners for multiplying any two functions varying with time which are sensitive to input signals of a few micro-amperes.

According to the present invention a Hall effect device comprises a plate of a material having an appreciable Hall constant, the major faces of the plate being substantially rhombic in shape with diagonals of different length. Means are provided for generating a magnetic field of variable magnitude in a direction substantially normal to the major faces of the plate, and an electrode is also provided at each corner of the plate, with input connections being made to the electrodes at one pair of opposite corners of the plate to enable the passage of electric current between those electrodes in operation. Output connections are coupled to the electrodes at the other pair of opposite corners of the plate.

Satisfactory operation has been obtained with plates in which the rhombic shape is such that the ratio of the length of the shorter diagonal to that of the longer diagonal lies in the range 0.5–1.0. Preferably, to reduce magneto-resistive effects, this ratio lies in the range 0.5–0.8. The opposite corners, the electrodes at which are connected to the input connections, are preferably those at the ends of the longer diagonal.

The electrodes may be small areas of metal deposited on either of the major faces of the plate at the corners. Electric leads may be soldered to the electrodes.

The element may be mounted in a suitable air-gap in a magnetic core arrangement carrying one or more electric coils arranged so that, on energization by a suitable current, a magnetic field is set up in the air-gap normal to the major faces of the plate. There may be only a single coil; and where a sinusoidally varying magnetic field is required, this coil will be coupled to an alternating current source of the required frequency. The core may, for example, be two "E-cores" fitted together with the ends of the upper and lower arms in contact and an air-gap between the center arms in which gap the element is placed with its major faces normal to the direction of the arms. In this case, a single coil may be wound around the center arms.

The element is preferably obtained from a single crystal of the material concerned. Indium arsenide has been found to be a particularly suitable material, as the variation of the constant R with temperature is comparatively small up to 120° C. With indium antimonide, the constant varies more rapidly with temperature above room temperature, which may make it an unsuitable material for some applications. Germanium and silicon have smaller efficiencies and are therefore in general less suitable. Other materials which may be suitable for use include gallium phosphide and arsenide, aluminium phosphide, arsenide and antimonide and indium phosphide.

One process which may be employed in manufacturing the element is as follows. A plate of the selected material is cut to the required shape and ground, lapped or otherwise treated to obtain a plate of the required shape, but rather thicker than that finally required. Corner areas on one major face of the element are covered by a mask and the remainder of the face is sprayed with varnish. The mask is then removed and the corner areas are plated with a metal, for example copper, silver, gold or rhodium, a lead being soldered to each electrode. Other methods of depositing the electrodes on the appropriate areas may of course be employed if required.

After cleaning, the element is mounted, for example on an end surface of a magnetic core provided for the generation of the magnetic field, with that face on which the electrodes have been deposited being positioned upwards. The electrodes are then masked, and the thickness of the element is further reduced by etching. Alternatively, the crystal thickness may be reduced by ultra-sonic drilling. If required, the whole of the face not provided with electrodes may be etched or otherwise treated for this same purpose, as well as, or instead of, the other face.

Further according to the invention an arrangement for generating a voltage varying in accordance with the product of two quantities may comprise a Hall effect device according to the invention, together with means for controlling the magnetic field generating means to generate a field varying in accordance with the first quantity, and means for causing a current varying in accordance with the second quantity to flow through the element between the input connections. In an amplitude modulator, the first quantity is an electric oscillation of a desired carrier frequency, and the second quantity is a modulating signal. In a demodulator for an amplitude modulated oscillation, the first quantity is the amplitude modulated oscillation and, the second quantity is an electric oscillation of the frequency of the carrier of the modulated oscillation.

The construction and operation of a Hall effect device according to the present invention for use as a modulator will now be described with reference to the accompanying drawings in which:

FIGURE 1 shows a plan view of the Hall effect element with leads attached to the electrodes, FIGURE 2 shows the element in position in a magnetic core arrangement, FIGURE 3 shows a circuit diagram of the element connected for operation as a modulator, and FIGURES 4 and 5 show an exploded sectional view and a plan view of a part of an alternative arrangement of element and core.

Referring first to FIGURE 1, it will be seen that the element which is of indium arsenide, is in the form of a rhombic plate 1, the sides and shorter diagonal of the major faces of which are approximately 0.045 inch long and the longer diagonal of which is 0.08 inch long. At each corner, the plate 1 carries on the major surface which can be seen in FIGURE 1, an electrode 2 or 3, each of which has a copper wire lead 4 or 5 soldered to it. The lead 5 soldered to the upper one (upper as viewed in FIGURE 1 only) of the electrodes 3 is jointed to a further copper wire lead 6 having two closely spaced arms in the form of a narrow U-shaped loop extending across the plate 1.

In FIGURE 2, the plate 1 is shown in section, mounted in an air-gap formed between the ends of the center arms 9 of two E-cores 10, the outer arms 11 of which are in contact. An electric coil encircles the center arms 9 of the cores 10, a grounded electrostatic screen 13 (indicated by a dotted line) being provided between the coil 12 and the plate 1. The E-cores may for example be constructed of a ferrite material. On energization of the coil 12, the magnetic flux produced in the gap between the center arms 9 is normal to the major faces of the plate.

FIGURE 3 shows the element connected for operation as a modulator, the plate 1 being shown in plan view as in FIGURE 1 but in less detail. One of the leads 4 is connected directly to one terminal of a current source 15, the other terminal of which is connected to the tapping terminal of a potentiometer 16. The potentiometer resistance is connected across a small coil 17 which is wound on one of the cores 10, having a center tap which is connected to the other of the leads 4. The source 15 provides a current in operation which varies in accordance with the modulating signal.

The coil 12, surrounding the center arms 9 of the E-cores 10, is connected in series with a resistor 18 and a capacitor 19 across an alternating current voltage source 20, the frequency of which is that of the carrier of the modulated signal to be generated. The magnetic coupling between the coil 12 and the coil 17 and the plate 1 is indicated by the dotted circle A in FIGURE 3. The resistor 18 and capacitor 19 are provided for potential dropping and phase adjusting purposes, it being arranged, for example, where the source 20 is a 115 volts, 400 cycles per second power supply, that the voltage across the coil 12 is approximately 5 volts in operation.

The lead 5 from the lower one (as shown in the drawing) of the electrodes 3 on the plate 1 is connected directly to one of a pair of output terminals 21, the two ends of the lead 6, after passage across the plate 1, being connected across the resistance of a potentiometer 22. The tapping terminal of the potentiometer 22 is connected to the other of the output terminals 21. An output circuit 23, for example an amplifier, may be connected across the terminals 21 as shown and preferably includes a well screened high input impedance transformer in its input circuit.

In both the input current connections and the output voltage connections it is necessary to take account of the voltages which will be induced in the input and output circuits owing to the fact that they form closed loops which are coupled to the alternating field generated by the cores 10 in operation. In the case of the current input connections, the coil 17 is wound on one of the cores 10 so that it is coupled to the field produced by them. A small E.M.F. is thus induced in the loop formed by the coil 17 and the potentiometer 16, and a portion of this, in the required sense, can be tapped off by suitable adjustment of the potentiometer 16 to cancel any voltage induced in the loop formed by the input connections as a whole.

In the case of the output connections, the loop formed by the lead 6 and the potentiometer 22 takes the place of the loop formed by the coil 17 and potentiometer 16 in the input connections. The potentiometer 22 can be adjusted so that there is no component of carrier frequency in the output voltage oscillation, the modulator thus acting as a balanced modulator.

These induced voltages are in phase quadrature with the Hall voltage which is generated in the device. In some cases, for reasons that are not fully understood, a spurious in-phase voltage is also generated. This may be eliminated by coupling across the terminals 21, the center tap of the secondary winding of a transformer and, through a resistor, the tapping of a resistive potentiometer, the secondary winding and the potentiometer resistance being connected in a closed loop. The primary winding of the transformer is connected across a further output from the source 20. By adjusting the potentiometer tapping, the stray in-phase voltage can be cancelled. Alternatively, a small inductor may be connected in series with one of the leads 6.

In a typical case, using as the source 20, a power supply giving a voltage of 115 volts at a frequency of 400 cycles per second, the components shown in FIGURE 3 may have the following values, when using the element described above:

Potentiometer 16—100 ohms, resistor 18—2250 ohms, capacitor 19—5 microfarads and potentiometer 22—10 ohms The current in coil 12 might be 50 milli-amps giving a peak field $B_0$ of, say 1400 gauss, the input and output impedances of the device then being respectively 50 ohms and 15 ohms. The trans-resistance with the output terminal open circuited is then 2.5 ohms.

In all cases, the impedances of the source 15 and the output circuit 23 should be as high as possible to avoid second order effects. If this is done, a modulator such as that described above can give less than 1% harmonic distortion in the output. This property renders the modulators particularly suitable for use, for example, in control systems where modulated alternating current signals are employed, as any harmonics generated may lead to large residual signals appearing at points where two or more such signals are added.

The device is also noteworthy for its temperature stability. Over the temperature range 20–100° C., the equivalent input drift is one micro-amp or less. The temperature range could probably be extended to −40° C. without appreciable change in this drift current. The reduction of drift to such a level becomes important when working with small signals, the device being sensitive to input signals of a few microamps.

It will be appreciated that the devices according to the invention, such for example as that described with reference to the drawing, may equally be employed as demodulators for amplitude modulated oscillations, the modulated oscillation being supplied to the device as the input current from source 15 (FIGURE 3) and the carrier frequency signal required to effect demodulation being supplied, as in the modulator, from the source 20. In general, the devices may be used to multiply any two functions varying with time. The functions are applied to the device as a current varying with time and a magnetic field varying with time, the latter being derived, for example, from a current flowing in a coil associated with a magnetic core arrangement.

In constructing the device described with reference to the drawing, the following process has been employed. A plate of indium arsenide is lapped to the required thickness of 0.002 inch and is then cut to the required shape, i.e. a rhombus having sides of 0.045 inch and angles of 60° and 120°. Masks are then placed over the corners of one of the major faces which is then sprayed with varnish. The surface areas exposed on removal of the masks are then plated with metal (copper or rhodium is preferred) to form the electrodes required. A copper wire lead is then soldered to each of the four electrodes.

The element is then cleaned with suitable solvents and mounted on the end face of center arm 9 of one of the E-cores 10, with the face carrying the leads and electrodes positioned uppermost. The leads and electrodes are then masked, and the exposed areas of the face of the plate are then etched chemically by use of an etching composition, containing for example acetic, hydrofluoric and nitric acids together with a small proportion of bromine, to reduce the thickness of the plate and thus to increase the sensitivity of the element. Alternatively this thinning may be carried out by ultra-sonic drilling; and either process can be carried out, if desired, over the whole area of the other major face of the plate if the plate is mounted the other way up. Finally the element is cleaned, and then "potted" in a thin layer of a resin material such as that sold under the registered trademark "Araldite."

The two E-cores 10 on final assembly of the device are suitably clamped together in the required juxta-position.

In an alternative construction, shown in FIGURES 4 and 5, the element 24 is mounted centrally on one face of a circular ferrite plate 25 which fits against the open end of a ferrite pot core 26 having a coil 27. The central face 28 of the core 26 is depressed slightly relative to the outer annular face 29 to allow room for the element 24. In FIGURE 4, the plate 25 is shown separated from the core 26.

FIGURE 5 shows a plan view of the plate 25 looking from the underside in FIGURE 4. The leads to the element 24, arranged as for the element 1 in FIGURE 1, are provided by a fired colloidal silver preparation contained in grooves in the face of the plate 25 formed by ultrasonic drilling. These leads are indicated in FIGURE 5 collectively by the reference 30. At their ends remote from the element 24, the leads 30 are soldered to copper wire leads 31 for external connection which are secured in position by a thin body 32 of "Araldite" (registered trademark).

The plate 25 having been prepared with the leads 30 and 31 in position, the element 24, with its electrodes already on it, is secured in the correct position by means of further "Araldite" (registered trade mark). The electrodes are then connected to the leads 30 by the application of further silver paste which is then fired, forming connections 33. The final etching of the element, as described above, can then be carried out, as before, without there being, however, any need to mask the silver leads; and the plate 25 is then secured in position relative to the core 26.

The device shown in FIGURES 4 and 5 may be used in a circuit arrangement similar to that of FIGURE 3.

While there have been described above what are presently believed to be preferred forms of the invention, variations thereof will be obvious to those skilled in the art and all such changes and variations which fall within the spirit of the invention are intended to be covered by the generic terms in the appended claims, which are variably worded to that end.

We claim:

1. A Hall effect device comprising a plate of a material having an appreciable Hall constant, said plate having a pair of major faces, each major face of said plate being substantially in the shape of a rhombus having diagonals of differing lengths, means for generating a magnetic field of variable magnitude in a direction substantially normal to said major faces of said plate, an electrode at each corner of said plate, input means coupled to a first pair of said electrodes located respectively at one pair of opposite corners of said rhombic plate thereby to enable the passage of electric current between said first pair of electrodes in operation, and output means coupled to a second pair of said electrodes located respectively at the other pair of opposite corners of said rhombic plate.

2. A Hall effect device according to claim 1 wherein said means for generating a magnetic field comprises magnetic core means having an air gap in which said plate is mounted, said core means carrying coil means thereon positioned to produce, upon energization, a magnetic field extending across said air gap in a direction normal to said major faces of said plate.

3. A Hall effect device according to claim 2 in which said core means comprises two "E-cores" fitted together with the ends of the upper and lower arms in contact and with an air-gap between the center arms, said plate being positioned within said air gap with its major faces normal to the direction of said arms.

4. A Hall effect device according to claim 1 in which said material is selected from the group consisting of indium arsenide and indium antimonide.

5. A Hall effect device for generating an output varying in accordance with the product of first and second input quantities, the device comprising a plate of a material having an appreciable Hall constant, said plate being substanially rhombic in shape, and having a pair of diagonals of different lengths, magnetic core means having an air gap, coil means adjacent said core means for causing a magnetic field to be set up in said air gap, means supporting said plate in said gap with its major faces normal to any magnetic field set up therein, means for causing a current to flow in said coil means the magnitude of which current depends upon the magnitude of said first quantity, whereby the magnetic field in said air gap is caused to vary in dependence upon the magnitude of said first quantity, an electrode at each corner of said plate, a pair of input connections connected one to each of the electrodes at one pair of opposite corners of the plate, source means for applying a voltage across said input connections to cause a current to flow through the plate between said pair of input connections, said source means including means for varying said voltage and in consequence the current in said plate in dependence upon the magnitude of said second quantity, and a pair of output connections coupled to the electrodes at the other pair of opposite corners of said plate for providing an output voltage having a magnitude related to the product of said first and second quantities.

6. A Hall effect device comprising a plate fabricated of a material having an appreciable Hall constant, said plate being substantially in the shape of a rhombus having a pair of diagonals that differ in length, the ratio of the length of the shorter diagonal to the length of the longer diagonal being in the range of 0.5 to 0.8, means for generating a magnetic field passing through said plate, an electrode positioned at each of the four corners of said plate, input means coupled to a first pair of said electrodes located respectively at one pair of opposite corners of said plate, and output means coupled to a second pair of said electrodes located respectively at the other pair of opposite corners of said plate.

7. A Hall effect device comprising a plate of material having an appreciable Hall constant, said plate being substantially in the shape of a rhombus having a pair of diagonals that differ in length, means for generating a magnetic field in a direction transverse to the plane of said plate, electrode means at the corners of said plate, said electrode means comprising a first pair of electrodes located respectively at opposing ends of the longer one of said diagonals and a second pair of electrodes located respectively at the opposing ends of the shorter one of said diagonals, input means coupled across said first pair of electrodes, and output means coupled across said second pair of electrodes.

8. In a Hall effect device, a plate comprising a material having an appreciable Hall constant, said plate having a pair of generally parallel major faces each of which is substantially in the shape of a rhombus having a pair of diagonals that differ in length, means for generating a magnetic field passing through said plate in a direction substantially normal to said major faces of said plate, an electrode at each of the four corners of said plate, input means coupled to a first pair of said electrodes located respectively adjacent opposite ends of one of said diagonals for enabling the passage of an electric current between said first pair of electrodes, and output means coupled to a second pair of said electrodes located respectively adjacent opposite ends of the other of said diagonals, said output means including an electrically conductive lead in the form of a narrow U-shaped loop extending across said plate and coupled at its apex to one of said second pair of electrodes.

9. In a Hall effect device, a plate comprising a material having an appreciable Hall constant, said plate having a pair of generally parallel major faces each of which is substantially in the shape of a rhombus, said major faces each having a pair of diagonals that differ in length from one another, means for generating a magnetic field of variable magnitude in a direction substantially normal to the major faces of the plate, said field generating means comprising a ferromagnetic pot-core having an annular pole face, said pot-core also having a central pole face surrounded by, and depressed with respect to, said annular pole face, a ferromagnetic disc fitted against said annular pole face, said plate being mounted on said disc to lie between said disc and said central pole face, coil means on said pot-core for setting up said magnetic field therein, an electrode at each corner of said plate, input means coupled to a first pair of said electrodes located at one pair of opposite corners of said plate to enable the passage of electric current between said first pair of electrodes in operation, and output means coupled to a second pair of said electrodes located at the other pair of opposite corners of said plate.

10. A Hall effect device for producing an output signal having a magnitude related to the product of first and second input quantities, comprising a plate fabricated of a material having an appreciable Hall constant, said plate having a pair of rhombic shaped major faces each of which has a pair of diagonals of differing lengths, magnetic core means having an air gap, coil means for causing a magnetic field to be set up in said air gap, means supporting said plate in said gap with its major faces normal to the direction of said magnetic field, means for causing a current to flow in said coil means the magnitude of which current depends upon the magnitude of said first input quantity, whereby the magnetic field in said air gap is caused to vary in dependence upon the magnitude of said first input quantity, an electrode at each corner of said plate, said electrodes comprising a first pair of electrodes located respectively adjacent the opposing ends of one of said diagonals and a second pair of electrodes located respectively adjacent the opposing ends of the other of said diagonals, a pair of input connections connected respectively to said first pair of electrodes, means for applying a control voltage across said input connections to cause a current to flow through said plate between said input connections, means for varying said control voltage and in consequence the current in said plate in dependence upon the magnitude of said second input quantity, a first output connection coupled to one of said pair of electrodes, a second output connection comprising a narrow U-shaped conductive loop which is electrically connected at its apex to the other one of said second pair of electrodes, said conductive loop extending diagonally across said plate in a direction extending generally from one to the other of said second pair of electrodes, an electrical resistance connected between the open ends of said loop, and a variable tapping on said resistance for producing said output signal between said tapping and said first output connection.

11. In an electric amplitude modulator, a plate comprising a material having an appreciable Hall constant, said plate being in the shape of a rhombus having diagonals of different lengths, carrier oscillation means comprising a source of electric alternating current of substantially constant amplitude, means energized by said alternating current operative to apply an alternating magnetic field substantially normal to the major faces of said plate, two input electrodes electrically connected to said plate at a first pair of opposite corners respectively of said plate, a modulating signal source connected across said input electrodes operative to effect an electric flow in said plate between said input electrodes, and two output electrodes electrically connected to said plate at the other pair of opposite corners respectively of said plate for providing an output signal of the same frequency as that of said carrier oscillation and modulated in amplitude in accordance with said modulating signal.

12. An electric demodulator for demodulating an amplitude modulated signal, comprising a plate fabricated of a material having an appreciable Hall constant, said plate being in the shape of a rhombus and having diagonals of different lengths, two input electrodes electrically connected to said plate at a first pair of opposite corners respectively of said plate, a source of an amplitude modulated carrier oscillation connected across said two input electrodes, means for applying an alternating magnetic field across said plate in a direction substantially normal to the major faces of the plate, said alternating magnetic field being substantially constant in amplitude and having a frequency equal to the frequency of said carrier oscillation, and two output electrodes electrically connected to said plate at the other pair of opposite corners respectively of said plate for providing an output signal dependent upon the modulation of the said modulated carrier oscillation.

References Cited in the file of this patent

UNITED STATES PATENTS

| | | |
|---|---|---|
| 2,774,890 | Semmelman | Dec. 18, 1956 |
| 2,902,660 | Weisshaar | Sept. 1, 1959 |
| 2,939,091 | Bock et al. | May 31, 1960 |
| 2,964,738 | Barney et al. | Dec. 13, 1960 |

OTHER REFERENCES

Webster's 3rd New International Dictionary, 1961 edition, page 1949.